US008214336B2

(12) United States Patent
Cohen et al.

(10) Patent No.: US 8,214,336 B2
(45) Date of Patent: Jul. 3, 2012

(54) PRESERVATION OF DIGITAL CONTENT

(75) Inventors: Simona Cohen, Haifa (IL); Ealan Henis, Haifa (IL); Shahar Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 12/485,071

(22) Filed: Jun. 16, 2009

(65) Prior Publication Data

US 2010/0318547 A1    Dec. 16, 2010

(51) Int. Cl.
*G06F 7/00*    (2006.01)
*G06F 17/00*    (2006.01)

(52) U.S. Cl. ........................................................ 707/661

(58) Field of Classification Search ................ 707/999.2, 707/661, 740, 694
See application file for complete search history.

(56) References Cited

U.S. PATENT DOCUMENTS

| | | |
|---|---|---|
| 6,606,693 B1 | 8/2003 | Morris |
| 6,691,309 B1 | 2/2004 | Lorie |
| 6,959,326 B1 * | 10/2005 | Day et al. ...................... 709/217 |
| 7,212,322 B2 | 5/2007 | Abhyankar et al. |
| 7,403,224 B2 | 7/2008 | Fuller et al. |
| 2004/0163033 A1 * | 8/2004 | Wolfe et al. .................... 715/500 |
| 2005/0021512 A1 | 1/2005 | Koenig |
| 2007/0260621 A1 | 11/2007 | Smolen et al. |
| 2007/0283417 A1 | 12/2007 | Smolen et al. |
| 2008/0005194 A1 | 1/2008 | Smolen et al. |
| 2008/0072290 A1 | 3/2008 | Metzer et al. |
| 2009/0198670 A1 * | 8/2009 | Shiffer et al. ..................... 707/5 |

OTHER PUBLICATIONS

Federal Register Notice Nov. 2007 http://csrc.nist.gov/groups/ST/hash/documents/FR_Notice_Nov07.pdf.

* cited by examiner

*Primary Examiner* — Alexey Shmatov
(74) *Attorney, Agent, or Firm* — Jason Far-Hadian

(57) ABSTRACT

Methods for generating a characterizing summary and generating a collection of relevant preservation objects in a preservation system are provided. A characterizing summary is generated by collecting first information about a preservation object; collecting second information about other preservation objects or other metadata; generating a characterizing summary according to the first information and the second information; and adding the characterizing summary to the preservation object. A collection of relevant preservation objects is generated by accessing one or more preservation objects by way of one or more metadata included in a target preservation object constructed for content data; determining whether each of the accessed preservation objects is relevant to the target preservation object; adding each relevant preservation object to a list of relevant preservation objects; and generating the collection of relevant preservation objects according to the list of relevant preservation objects.

13 Claims, 6 Drawing Sheets

PRESERVATION OF DIGITAL CONTENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to data storage systems and, more particularly, to preservation of digital content in a data storage system.

BACKGROUND

Digital preservation ("preservation") refers to the ability to sustain the understandability or usability of digital content for future use regardless of changes in the applied technology or the initial intended use.

A data storage system that is implemented for preservation (i.e., "a preservation system") typically generates preservation objects associated with digital content. A preservation object comprises content data and one or more metadata. The content data includes the actual data to be preserved and each metadata includes the information used for understanding or utilizing the content data or other metadata in the preservation object.

In existing preservation systems, a user or a process external to the preservation system is responsible for generating metadata (e.g., in a manual fashion). Such preservation systems use ad-hoc methods to search for metadata relevant to a particular preservation target. The quality and amount of the metadata are dependent on a person's ability to search for the metadata, as well as the availability of resources to invest in implementing a robust preservation scheme.

SUMMARY

The present disclosure is directed to systems and corresponding methods that facilitate generating characterizing summaries (i.e., enriched metadata) and grouping relevant preservation objects in a preservation system.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for generating a characterizing summary in a preservation system is provided. The method comprises collecting first information about content data or one or more metadata included in a preservation object constructed for the content data; collecting second information about the content data and the metadata by searching for other preservation objects or other metadata; generating a characterizing summary for the content data or the metadata according to the first information and the second information; and adding the characterizing summary to the preservation object. The preservation object is stored on one or more storage media in the preservation system.

In accordance with one embodiment, a method for generating a collection of relevant preservation objects in a preservation system is provided. The method comprises accessing one or more preservation objects by way of one or more metadata included in a target preservation object constructed for content data; determining whether each of the accessed preservation objects is relevant to the target preservation object; adding each relevant preservation object to a list of relevant preservation objects; and generating the collection of relevant preservation objects according to the list of relevant preservation objects. The target preservation object is stored on one or more storage media in the preservation system.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
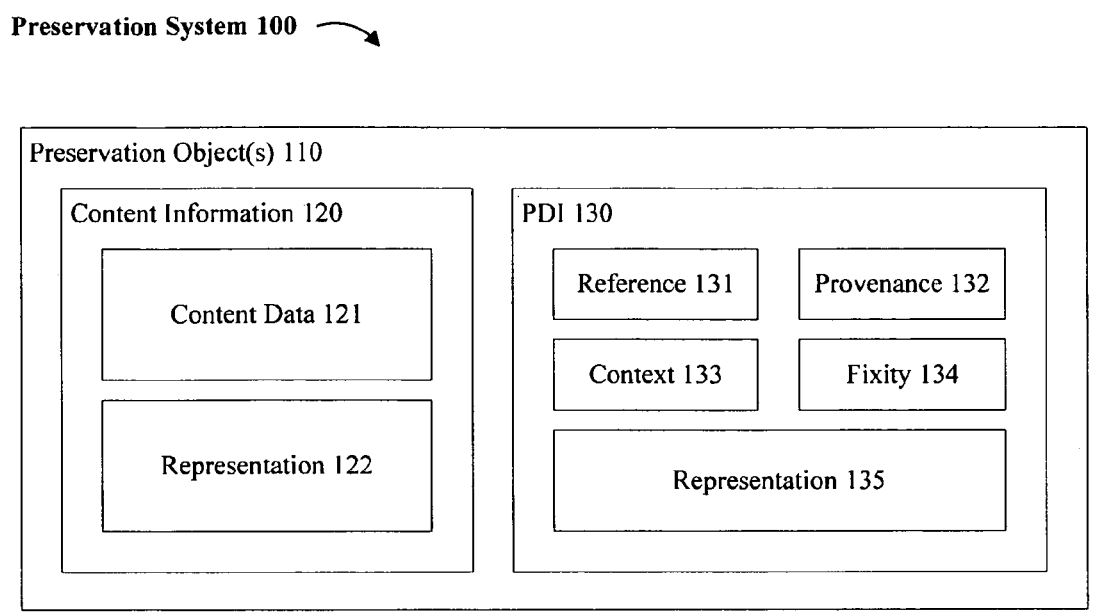
FIG. 1 illustrates an exemplary preservation system, in accordance with one or more embodiments.

Referring to FIG. 1, in accordance with one embodiment, an exemplary preservation system 100 comprises one or more preservation objects 110. Each preservation object 110 comprises content information 120 and preservation descriptive information (PDI) 130. The content information 120 comprises content data 121 and representation metadata 122 for understanding or utilizing the content information 120. In one implementation, the representation metadata 122 may identify which hardware or software to use to view the content data 121.

The PDI 130 comprises reference metadata 131, provenance metadata 132, context metadata 133, fixity metadata 134, and representation metadata 135. The reference metadata 131 includes one or more identifiers for referencing the content information 120. In one implementation, at least one of the identifiers may be globally unique and persistent. The provenance metadata 132 documents the history and origin of the content information 120, any changes to the content information 120 subsequent to its creation, and the chain of ownership for the content information 120.

The context metadata 133 documents the content information 120's relationships with its environment and the reasons the content information 120 was created. The fixity metadata 134 is used to verify that the content information 120 has not been modified in an undocumented manner. The representation metadata 135 includes metadata for understanding or utilizing the PDI 130.

One or more of the metadata in the content information 120 or the PDI 130 may comprise a characterizing summary. The characterizing summary may comprise terms and links for understanding or utilizing the content data information 120 or the PDI 130. The terms may, for example, include words, sentences, keywords, or any other metadata. The links may, for example, include references to other preservation objects or external repositories (e.g., other preservation systems, web sites on the Internet).

In one embodiment, the characterizing summary may be used to identify other preservation objects that are relevant to the preservation object 110. If such a preservation object is found, the preservation object may be associated or grouped with the preservation object 110 as part of a collection of relevant preservation objects so that the preservation system 100, a user, or an external process may conveniently access preservation objects that are relevant to the preservation object 110 in order to understand or use some portion of the preservation object 110.

A preservation system, a user, or an external process may access characterizing summaries or collections of relevant preservation objects in order to understand or use digital content. For example, a preservation system may generate a preservation object for a document saved by a user. At a point in the future, the same or another user or system may access the document but not be able to understand a subject or issue in the document.

In such a scenario, the user or system may access a characterizing summary of the preservation object for the document (e.g., by accessing the document's properties) or one or more characterizing summaries of other preservation objects that are relevant to the subject or issue (e.g., by accessing a collection of preservation objects). A term in one of the characterizing summaries may identify a source (e.g., a definitive textbook or on-line content) that provides additional information about the subject, for example. Desirably, a reference in one of the characterizing summaries may provide a link to another resource (e.g., a publication) dealing with the issue from a different angle, for example.

Figure 2:
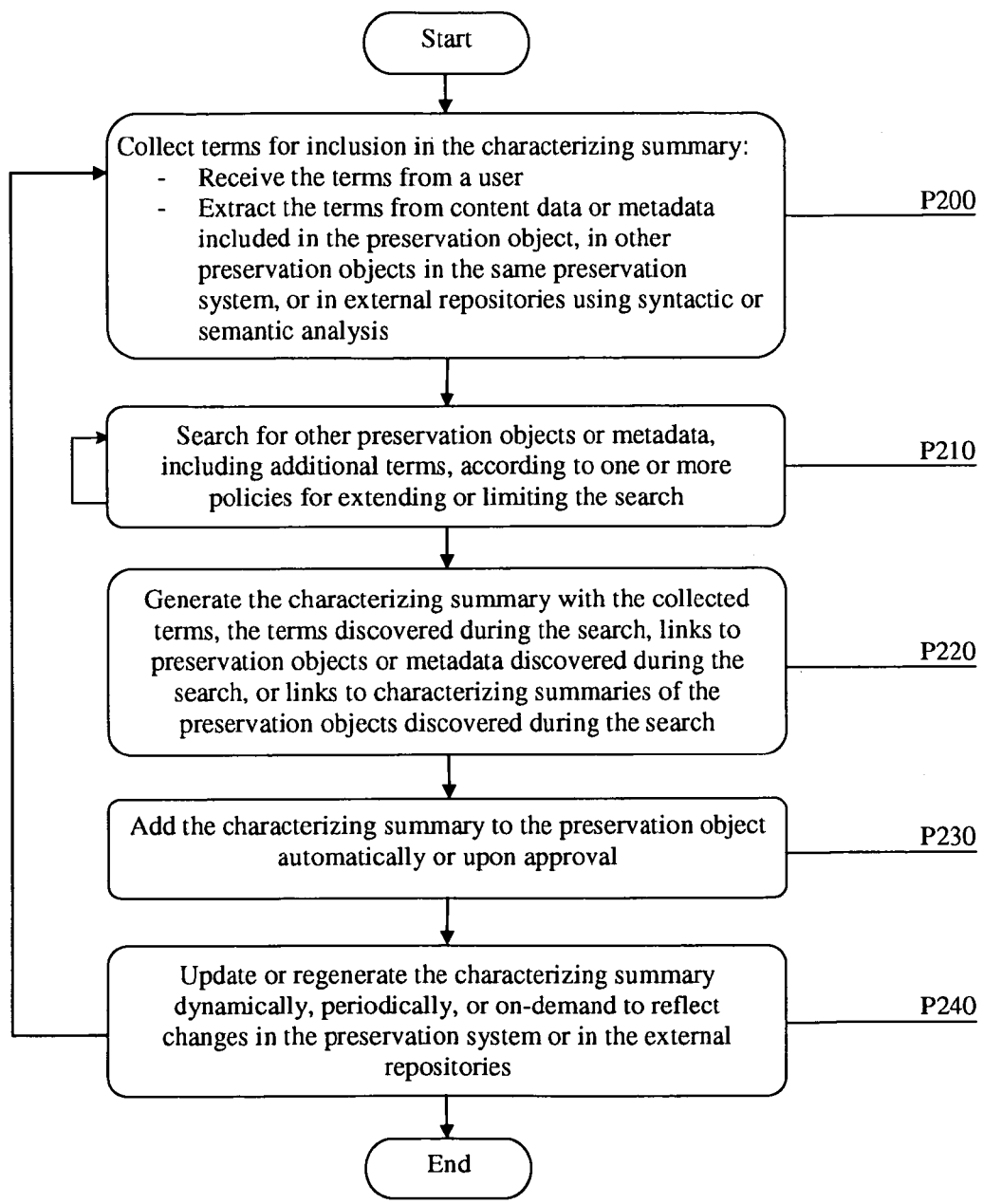
FIG. 2 is a flow diagram of a method for generating a characterizing summary, in accordance with one embodiment.

Referring to FIGS. 1 and 2, in accordance with one embodiment, the preservation system 100, a user, or an external process may collect terms for inclusion in a characterizing summary of a preservation object 110 (P200). The terms may be provided by a user or automatically extracted from the content data 121 or any of the metadata in content information 120 or the PDI 130 of the preservation object 110 using syntactic or semantic analysis. For example, the preservation system 100 or a process may automatically extract content headers, table and figure captions, most frequently used terms, or other terms for understanding or utilizing the content information 120 or the PDI 130.

Once the terms are collected, the preservation system 100, a user, or an external process may use the terms to initiate a search for other preservation objects or metadata, including additional terms, for understanding or utilizing the content information 120 or the PDI 130 (P210). It is noteworthy that any search methodology available (e.g., search engines) may be used to search for the other preservation objects or metadata. In one embodiment, the search may be performed according to default or user-defined policies for extending or limiting the search. Some exemplary policies are provided below.

In one implementation, the preservation system 100, a user, or an external process may extend the search to external repositories (e.g., other preservation systems, the Internet). Please note that, in some preservation systems, metadata may also reside in a catalog of a content management system, and this metadata may also be searched and queried in an extended search.

In one implementation, the preservation system 100, a user, or an external process may extend the collection or search by recursively performing the search on the search results, including but not limited to previously discovered preservation objects and metadata. A particularly identified condition or a recursion level defined by the policy may be used to terminate the search process.

In another implementation, the preservation system 100, a user, or an external process may limit the search to one or more domains (e.g., research fields, industries) identified by an entity such as a user, an automated categorization algorithm, or other means. For example, the preservation system 100, a user, or an external process may search domain-specific repositories, databases, or sources (e.g., PubMed for healthcare, Lexis-Nexis for law, etc.).

In yet another implementation, the search may be initiated according to limiting criteria such as content type or format, date of creation or preservation, storage location, or other finitely definable criteria. For example, the search may be directed to preservation objects or metadata that are in the English language, created after a given date, and stored in a given location.

Still referring to FIGS. 1 and 2, upon completing the collection and search processes, the preservation system 100, a user, or an external process may generate a characterizing summary to include the collected terms and the terms discovered during the search and provide links to preservation objects or metadata discovered during the search. In one implementation, links to characterizing summaries of the preservation objects discovered during the search may also be provided (P220).

The characterizing summary may be added to the preservation object 110 automatically by the preservation system or upon approval by a user or an external process (P230). Once the characterizing summary is generated and added to the preservation object 110, the characterizing summary may be updated or regenerated dynamically (e.g., in response to a new preservation being added to the preservation system 100), periodically, or on-demand to reflect changes in the preservation system 100 or in the external repositories (P240). For example, the preservation system 100, a user, or an external process may repeat the collection and search processes and either update the terms and links in the already-existing characterizing summary or generate and add a new characterizing summary to the preservation object 110.

Figure 3A:
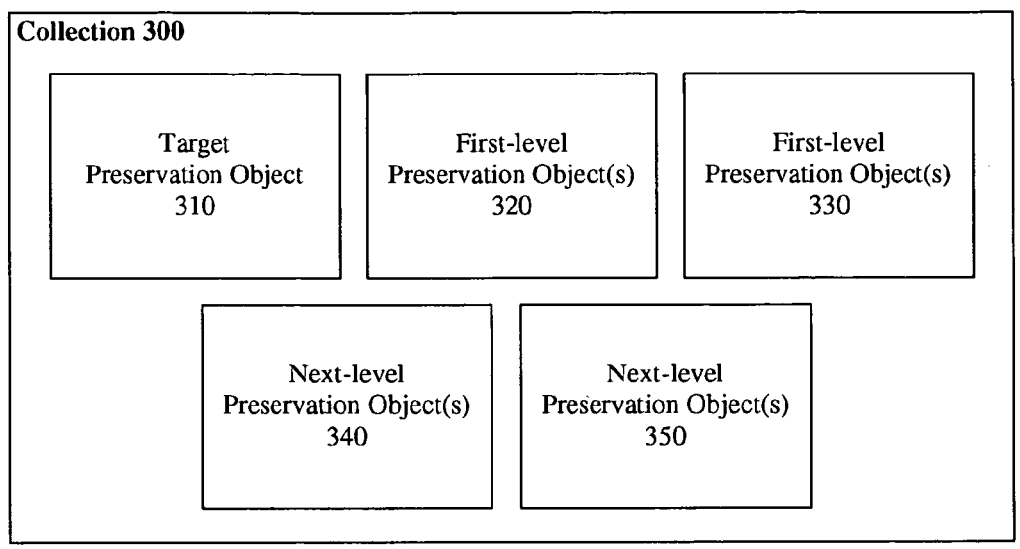
FIG. 3A illustrates an exemplary collection of preservation objects, in accordance with one embodiment.

Referring to FIG. 3A, in accordance with one embodiment, an exemplary collection of preservation objects 300 may be constructed to associate or group a target preservation object 310 with one or more first-level preservation objects 320 or 330 or next-level preservation objects 340 or 350. Each first-level preservation object 320 is a preservation object that is returned by a search using the terms included in the characterizing summary of a target preservation object. Each next-level preservation object 330 is a preservation object that is referenced by a link included in a target preservation object.

Each next-level preservation object 340 is a preservation object that is returned by a search using the terms included in the characterizing summary of a first-level preservation object or another next-level preservation object. Each next-level preservation object 350 is a preservation object that is referenced by a link included in a first-level preservation object or another next-level preservation object. Each of the first-level and next-level preservation objects 320, 330, 340, and 350 are relevant to the target preservation object 310 (i.e., include terms that are same or similar to the target preservation object 310).

It is noteworthy that the policies described earlier with respect to generating a characterizing summary may also be applied to generating the collection 300. For example, the search for relevant preservation objects to include in the collection 300 may be extended to preservation objects in external repositories or limited to preservation objects in an identified domain.

Figure 3B:
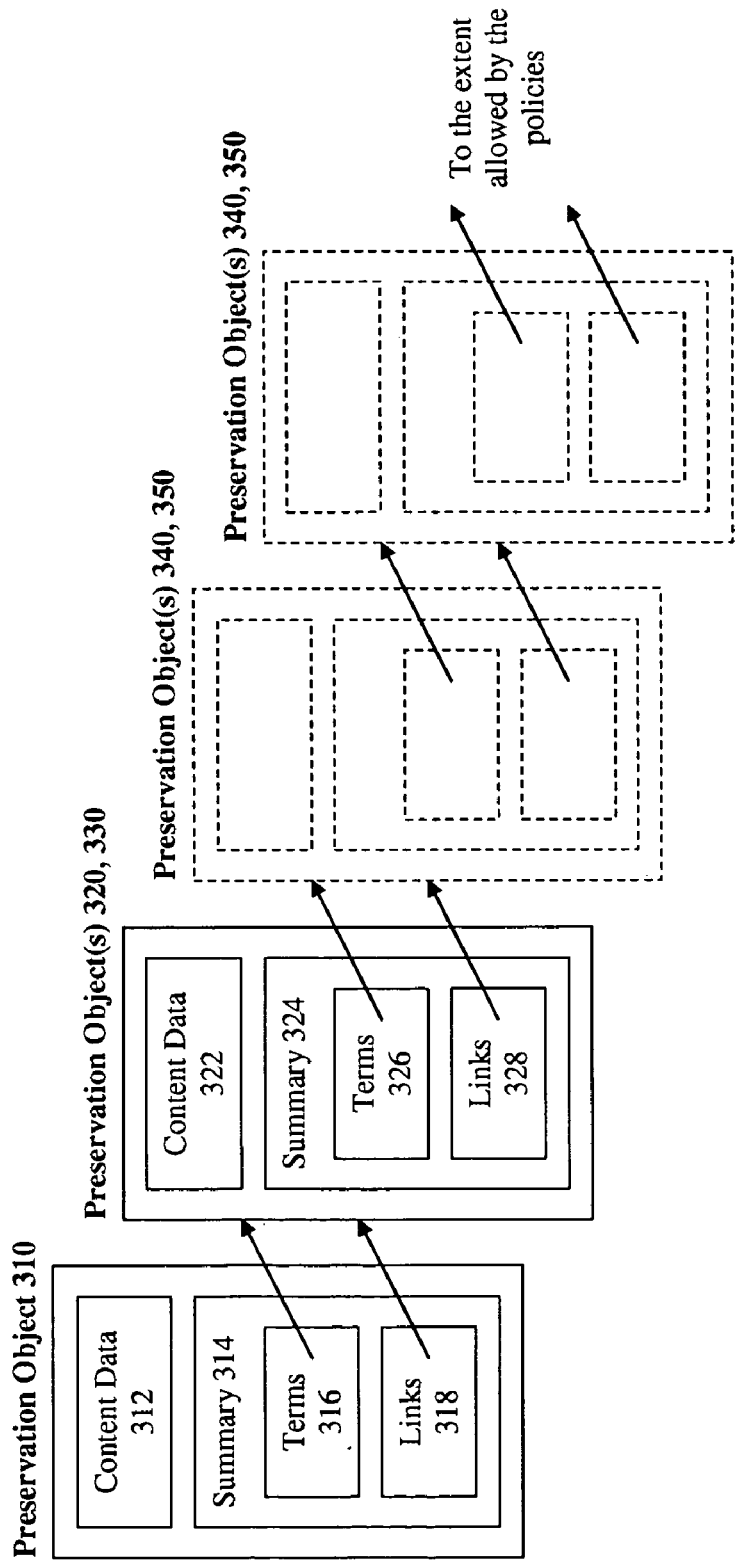
FIG. 3B illustrates an exemplary data layout for accessing relevant preservation objects, in accordance with one embodiment.

Referring to FIGS. 3A and 3B, in accordance with one embodiment, the target preservation object 310 may comprise content data 312 and a characterizing summary 314 including terms 316, which are used to search for first-level preservation objects 320 and links 318, which reference first-level preservation objects 330. As provided earlier, a characterizing summary may be included in metadata of a preservation object (e.g., reference metadata, provenance metadata, context metadata, fixing metadata, or representation metadata).

Each of the first-level preservation objects 320 or 330 may, in turn, comprise its own content data 322 and characterizing summary 324 including terms 326 used to search for next-level preservation objects 340 and links 328 referencing next-level preservation objects 350. This manner of accessing next-level preservation objects 340 may be perpetuated to the extent allowed by the policies defined in the preservation system. It is noteworthy that any search methodology available (e.g., search engines) may be used to search for the first-level preservation objects 320 and the next-level preservation objects 340.

Figure 4:
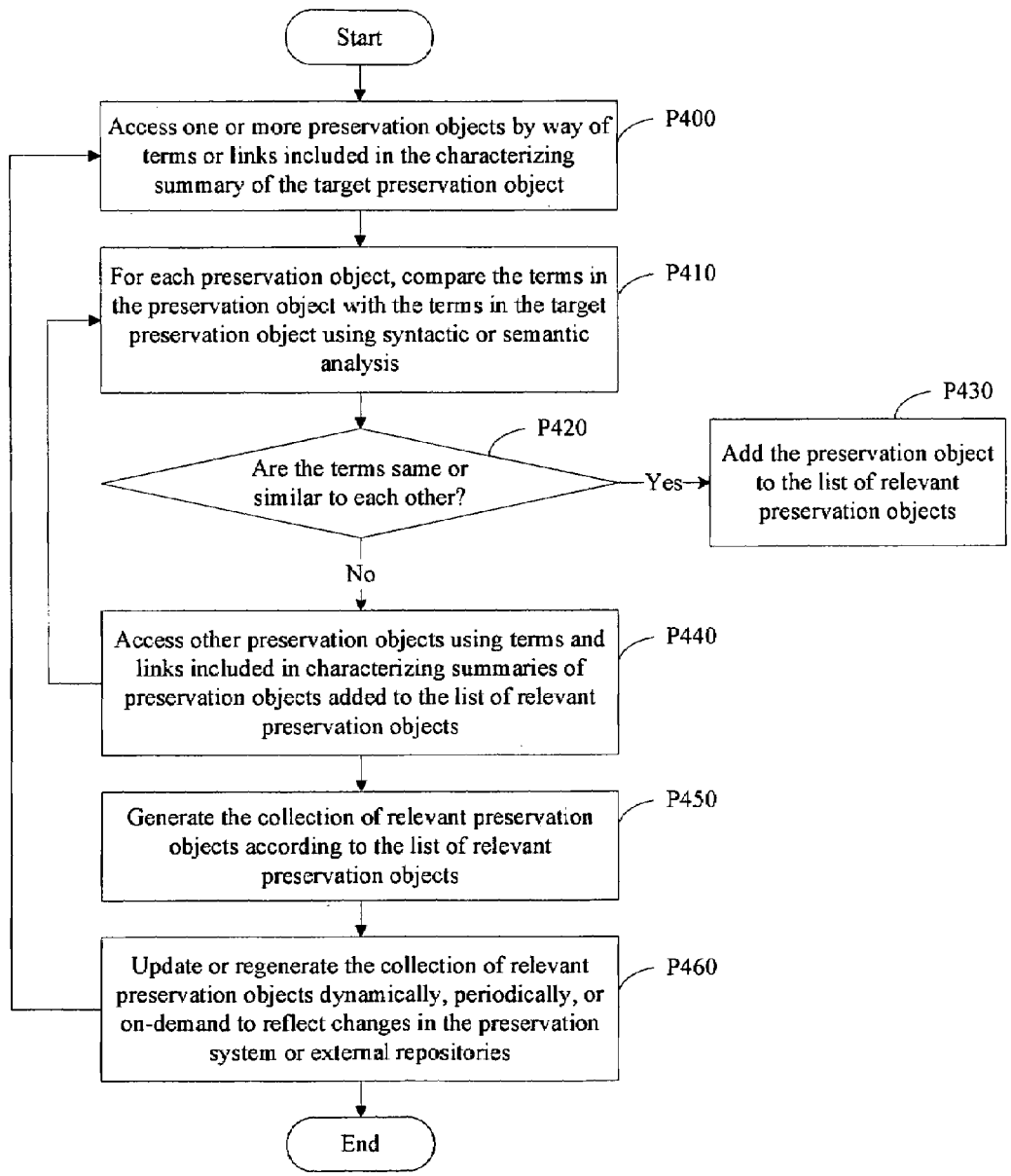
FIG. 4 is a flow diagram of a method for generating a collection of relevant preservation objects, in accordance with one embodiment.

Referring to FIGS. 3A, 3B, and 4, in accordance with one embodiment, a preservation system, a user, or an external process may access one or more preservation objects by way of terms 316 or links 318 included the characterizing summary 314 of the target preservation object 310 (P400).

For each accessed preservation object, the preservation system, a user, or an external process may compare the terms in the preservation object with the terms 316 in the target preservation object 310 using syntactic or semantic analysis (P410). If the terms are same or similar to each other (P420), the preservation object is determined to be relevant to the target preservation object 310 (i.e., a first-level preservation object 320 or 330) and added to the list of relevant preservation objects (P430).

Once the first-level preservation objects 320 or 330 are added to the list of relevant preservation objects, the preservation system, a user, or an external process may recursively access other preservation objects using the terms 326 and links 328 included in the characterizing summaries 324 of the first-level preservation objects 320 and 330 or terms and links included in the characterizing summaries of previously accessed next-level preservation objects 340 and 350 to the extent allowed by the policies (P440).

For each accessed preservation object, the preservation system, a user, or an external process may compare the terms in the preservation object with the terms 316 in the target preservation object 310 using syntactic or semantic analysis (P410). If the terms are same or similar to each other (P420), the preservation object is determined to be relevant to the target preservation object 310 (i.e., a next-level preservation object 340 or 350) and added to the list of relevant preservation objects (P430).

Once the first-level and next-level preservation objects 320, 330, 340, and 350 are added to the list of relevant preservation objects, the preservation system, a user, or an external process may generate the collection 300 according to the list of relevant preservation objects (P450). Then, the collection 300 may be updated or regenerated, dynamically, periodically, or on-demand, to reflect changes in the preservation system or in the external repositories (P460).

Advantageously, generation of characterizing summaries or collections of preservation objects may be partially or fully automated, depending on the level of user involvement. In addition, characterizing summaries or collections of preservation objects may be generated in advance, before they are needed by a preservation system, a user, or an external process. As a result, the efficiency of preservation may be improved, while the cost of preservation may be reduced.

Moreover, the likelihood of sustaining the understandability or usability of digital content over the years depends on the quantity or quality of metadata available for the digital content. Characterizing summaries and collections of relevant preservation objects may increase the quality or quantity of the metadata, thereby improving the effectiveness of preservation.

In different embodiments, the claimed subject matter may be implemented either entirely in the form of hardware or entirely in the form of software, or a combination of both hardware and software elements. For example, the claimed subject matter may be implemented in a controlled computing system environment that can be presented largely in terms of hardware components and software code executed to perform processes that achieve the results contemplated by the present invention.

Figure 5:
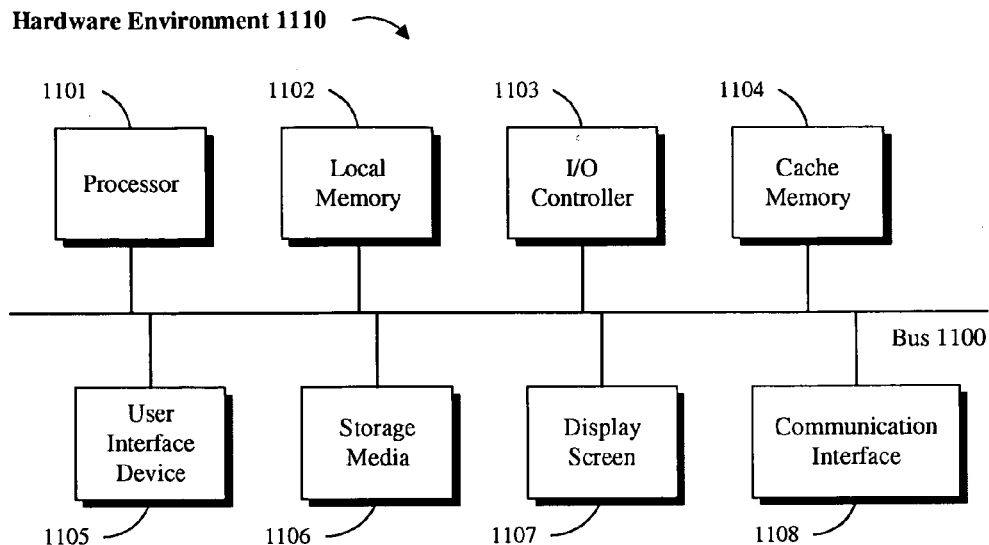
FIGS. 5 and 6 are block diagrams of hardware and software environments in which a system of the present invention may operate, in accordance with one or more embodiments.
Figure 6:
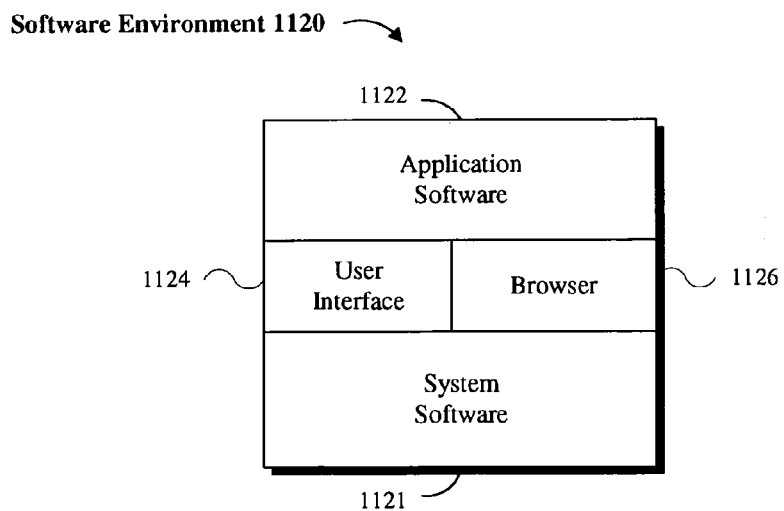

Referring to FIGS. 5 and 6, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In one embodiment, application software 1122 (e.g., a controller for a preservation system or an external process) may be executed on one or more hardware environments to generate a characterizing summary or a collection of relevant preservation objects. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 5, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 6, application software 1122 may comprise one or more computer programs that are executed on top of system software 1121 after being loaded from storage media 1106 into local memory 1102. In a client-server architecture, application software 1122 may comprise client software and server software (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter and are further defined by the claims and their full scope of equivalents.

What is claimed is:

1. A method of generating a characterizing summary in a preservation system, the method comprising:
   collecting first information about content data and one or more metadata included in a preservation object, wherein the preservation object includes a characterizing summary that is searchable and provides information about digital content associated with the preservation object, wherein a user's access to the characterizing summary provides the user with access to a sequence of inter-related links that point to other characterizing summaries in other preservations objects and to sources external to the preservation object, wherein the preservation object is created in association with a digital content that is being archived for future use;
   collecting second information about the content data and the metadata by searching for other preservation objects or other metadata stored on one or more preservation systems other than a preservation system on which the preservation object is stored;

generating a characterizing summary for the content data or the metadata included in the preservation object according to the first information and the second information, wherein the characterizing summary includes the links and portions of the first information and second information that are relevant to the digital content; and adding the characterizing summary to the preservation object, wherein the preservation object is stored on one or more storage media in the preservation system, and wherein the collecting of the first information and the second information is repeated after the corresponding digital content is archived during predetermined time intervals, such that the characterizing summary for the preservation object is updated according to the collected first and second information to allow a user access to additional information that is relevant to the digital content as the digital content ages over time.

2. The method of claim 1, wherein the first information is provided by at least one of a user or a process external to the preservation system.

3. The method of claim 1, wherein the first information is automatically extracted from the content data or the metadata using syntactic or semantic analysis.

4. The method of claim 1, wherein the first information and the second information are collected according to one or more policies for extending or limiting the searching.

5. The method of claim 4, wherein the policies are defined by at least one of the preservation system, a user, or a process external to the preservation system.

6. The method of claim 4, wherein the searching is extended to external repositories or limited to the preservation system.

7. The method of claim 4, wherein the searching is limited to one or more identified domains.

8. The method of claim 4, wherein the searching is performed recursively on search results until a stopping point defined by the policies is reached.

9. The method of claim 4, wherein the searching is performed according to one or more limiting criteria.

10. The method of claim 1, wherein the characterizing summary comprises terms that describe the content data or the metadata.

11. The method of claim 1, wherein the characterizing summary comprises links to the other preservation objects or the other metadata about the content data or the metadata.

12. The method of claim 1, wherein the adding is performed automatically by the preservation system or upon approval by a user or a process external to the preservation system.

13. The method of claim 1, further comprising updating or regenerating the characterizing summary dynamically, periodically, or on-demand to reflect changes in the preservation system or in external repositories.

* * * * *